United States Patent [19]
Kremenets

[11] Patent Number: 5,238,486
[45] Date of Patent: Aug. 24, 1993

[54] METHOD AND FURNACE FOR PRODUCTION OF LIQUID IRON

[76] Inventor: Yury D. Kremenets, 1526 Isaacs Ct., Maple Glen, Pa. 19002

[21] Appl. No.: 656,840

[22] Filed: Feb. 19, 1991

[51] Int. Cl.$^5$ .............................................. C21B 11/00
[52] U.S. Cl. ..................................... 75/492; 266/157; 266/162; 266/212
[58] Field of Search ............... 266/157, 162, 175, 168, 266/186, 212; 75/491, 492

[56] References Cited

U.S. PATENT DOCUMENTS

| | | | |
|---|---|---|---|
| 4,566,904 | 1/1986 | von Bogdandy et al. | 75/38 |
| 4,579,588 | 4/1986 | van Langen | 75/35 |
| 4,857,105 | 8/1989 | Hauk et al. | 75/38 |
| 4,877,449 | 10/1989 | Khnikis | 266/212 |
| 5,060,913 | 10/1991 | Reid | 266/162 |
| 5,064,174 | 11/1991 | Lehto | 266/900 |

FOREIGN PATENT DOCUMENTS 5222729 6/1977 Japan .................................. 266/215

*Primary Examiner*—Melvyn J. Andrews
*Attorney, Agent, or Firm*—William Freedman

[57] ABSTRACT

This non-blast process for the production of pig iron, cast iron, steel melt and nearly pure iron is carried out in a single furnace based on a tank-type design. Said types of iron melt can be produced in such single furnace individually or simultaneously in different combinations. The furnace interior is divided into immediately adjacent side-by-side chambers, at least one being an ore reduction chamber and at least one being a secondary chamber. Ore introduced into the top of the ore reduction chamber moves downward to the bottom of this chamber and is at first converted into sponge iron, which, absorbing carbon, is then converted into iron-carbon alloy in the form of a flowable layer at temperatures close to its melting point at about 1150 degrees C. while said flowable layer is collected on the bottom. In the melting zone of the secondary chamber such flowable semifinished product is completely melted, producing pig iron. Then the resulting melt is transferred into at least one bounded discharge zone of the secondary chamber from where it is removed from the furnace. In modified forms of the invention, refining and/or mixing can be introduced in the secondary chamber to produce the other types of iron melt referred to hereinabove.

24 Claims, 14 Drawing Sheets

METHOD AND FURNACE FOR PRODUCTION OF LIQUID IRON

FIELD OF THE INVENTION

The present invention relates to a method and furnace for the production of liquid iron from an iron-oxygen compound, preferably ore which is partially reduced to semifinished product in an ore reduction apparatus essentially with a reduction gas obtained from a secondary apparatus and such semifinished product is then supplied to said secondary apparatus, where it is melted by adding carbon-containing fuel and oxygen containing gas. As used in this application, the term "liquid iron" includes pig iron, cast iron, melt for any grade of steel and the nearly pure iron used for production of wrought iron.

BACKGROUND

The most commonly used method of producing liquid pig iron from iron ore is the blast furnace process. The resultant pig iron contains about 3 to 4.5% carbon together with other desirable or undesirable elements. These additives must be partly removed in a subsequent process in a steel converter if steel is to be produced from the pig iron. Current interest in non-blast reduction processes has been based upon potentially lower capital investment and more flexible operating conditions, especially since the apparatuses used in blast processes (e.g., blast furnaces, sinter plants, and coke oven plants) are all expensive in construction and operation. In known state-of-the art non-blast processes, iron ore is reduced to sponge iron in an ore reduction column or shaft furnace by the action of a reduction gas derived from a melting vessel located below said ore reduction apparatus. Said sponge iron is then supplied to the melting vessel where it is melted and completely reduced by adding a carbon-containing fuel and oxygen-containing gas. Such processes are disclosed, for instance, in U.S. Pat. Nos. 4,725,308, 4,579,558; 4,566,904; 4,316,739; 4,317,677. The economic disadvantages of said processes lie in the fact that a non-blast furnace includes two vertically-spaced separate apparatuses occupying a large total volume and having a relatively small horizontal area that detracts from specific throughput and limits maximum throughput. Furthermore, the non-blast process disclosed in U.S. Pat. No. 4,566,904—Bogdandy et al makes it possible to use coal with a lower energy or coal with a high portion of volatile components. This is achieved by means of injecting powdered coal and oxygen-containing gas into the melted material from the bottom of the melting apparatus, while oxygen is injected at the same time above the melted material to cause a postburning of produced reaction gas, providing additional heat transfer. However, such heat transfer is limited because the melted material is disposed on a relatively small area in relatively great depth. Therefore, the velocity of the reactions in the melted material are relatively slow, which results in limited throughput per unit of volume. Further, large heat losses are incurred because of the necessity to cool reduction gases to about 900 degrees C before introducing such gases into the ore reduction apparatus to prevent the produced solid particles of sponge iron from such overheating as might result in blocking the passage between the two apparatuses. For instance, in the above mentioned Bogdandy et al U.S. Pat. No. 4,566,904, the reduction gas that is removed from the melting apparatus is cooled from 1500 degrees C. to 900 degrees C.

Furthermore, prior non-blast processes consisting of ore reduction and melting steps have typically been concerned with production of pig iron only. For production of steel melt or nearly pure iron, pig iron is subjected to a refining operation that is now mainly a top-blown oxygen process carried out in a converter which is supplied with a lance for injecting oxygen into the melt. During transportation of the pig iron in a ladle and its charging into said converter, heat losses are inevitable. Moreover, copious fumes in the form of iron oxide particles around a micrometer in size are evolved during the oxygen blow. Such fume loss amounts to 2 to 3% of the metallic charge and thus represents an unduly large expense in such a plant.

Modern production of cast iron includes melting of pig iron with selected scrap, coke and fluxes in a cupola furnace. The latter is basically the same in design as the blast furnace, but it is about one fourth as large. The main disadvantage of such a process lies in the fact that the pig iron needs to be remelted and, therefore, additional considerable heat consumption is required.

OBJECTS OF THE INVENTION

An object of this invention is to provide non-blast methods and furnaces based on a new concept of a single apparatus having a plurality of immediately adjacent side-by-side ore reduction and secondary chambers cooperating to provide an economy in construction per ton of melt produced.

Another object of this invention is to provide non-blast furnaces having a larger horizontal area compared with those of typical modern blast and non-blast furnaces. This larger horizontal area results in higher specific throughput and a capability to increase maximum throughput, thus providing economy in construction.

Another object of this invention is to provide a capability of producing steel melt or nearly pure iron in a single apparatus by means of introducing a refining step that is carried out in the secondary chamber, thus providing an economy in construction per ton of steel melt produced.

Another object of this invention is to provide a capability of utilizing a melt produced from a scrap outside this furnace and to use this melt for carrying out a refining step within the secondary chamber.

Another object of this invention is to provide a capability for production of cast iron by means of introducing a melt produced from a selected scrap outside this furnace into the secondary chamber and mixing it with pig iron as a semifinished item, thus achieving an economy in heat consumption.

Another object of this invention is to provide a capability for simultaneous production of different types of iron melt in a single furnace that provides an economy in construction.

Another object of this invention is to increase the cooling threshold of introduced reduction gas so as to lower heat losses.

Another object of this invention is to provide an increasing heat transfer in the secondary chamber to lower the consumption of carbon-containing fuel and oxygen-containing gas.

Another object of this invention is to effect a preheating of an oxygen-containing gas inside the furnace that provides an economy in operation.

Other objects and advantages of the invention will be apparent from the following detailed description of various embodiments.

SUMMARY

Figure 1:
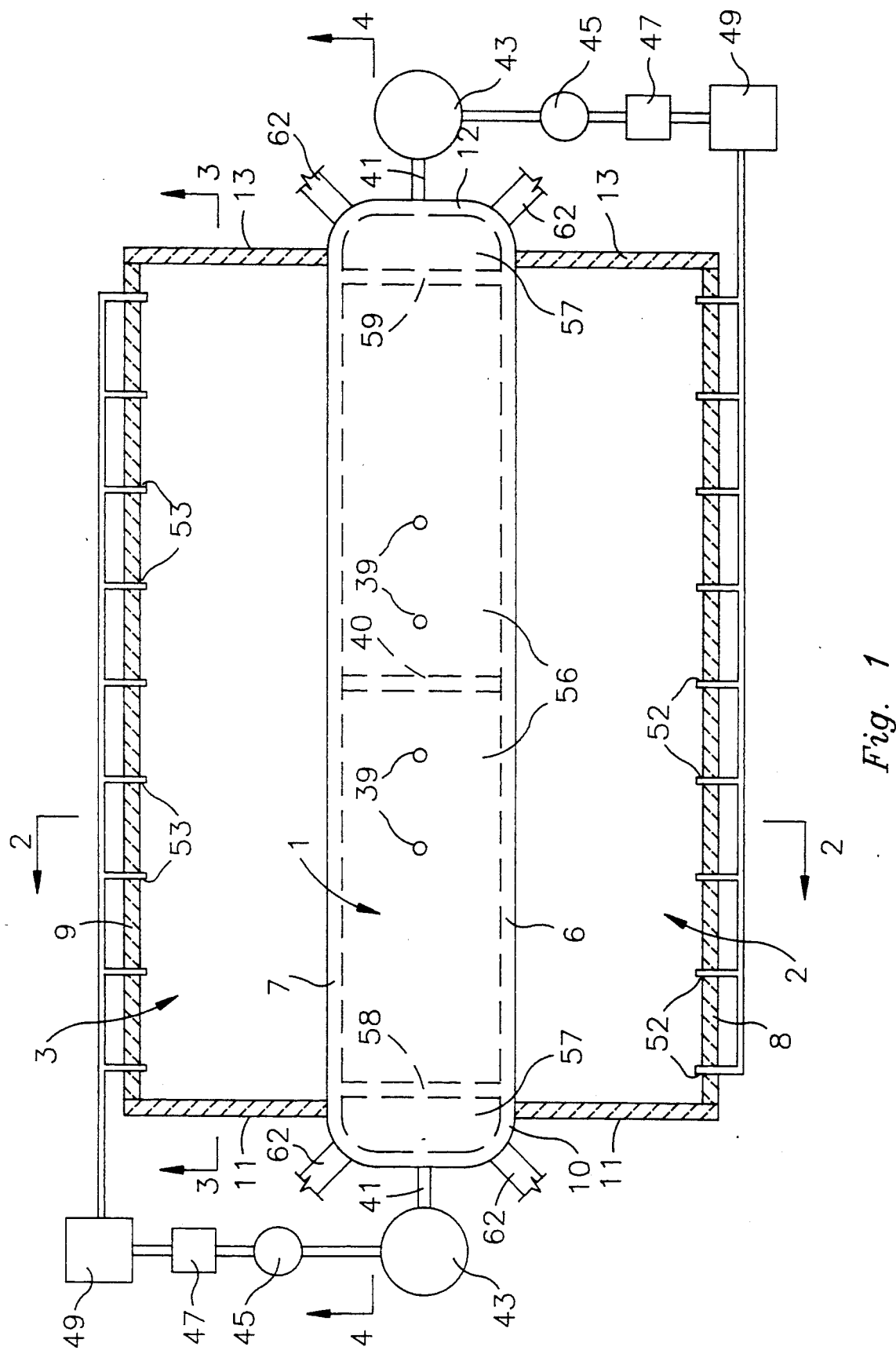
FIG. 1 is a horizontal sectional view of one form of my furnace taken along the line 1—1 of FIG. 2.

In accordance with one form of the present invention, the entire process for production of liquid iron is carried out in a single furnace of the tank-type that includes two side walls, two end walls and a bottom. The furnace interior is divided by means of one or more inner side walls into immediately adjacent side-by-side chambers, at least one being an ore reduction chamber and at least one being a secondary chamber. The ore reduction chamber is partially covered with at least one ceiling extending between the end walls and includes means forming at least one charge port for ore feeding from above and along this ore reduction chamber. Ore fed into the charge part moves downward to the bottom and is at first converted into sponge iron, which, absorbing carbon, is then converted into iron-carbon alloy in the form of flowable layer having a temperature of about the melting point of said iron-carbon alloy. This flowable layer, as a semifinished product, is collected on the bottom. A reduction gas is introduced into such ore reduction chamber in the vicinity of its bottom and is further transferred upward in counter-flow to the ore. Said semi-finished product which has collected on the bottom of the ore reduction chamber can flow into an adjacent secondary chamber through at least one passage since the bottom of the secondary chamber is lower than the bottom of the adjacent ore reduction chamber. Preferably, the bottom in each ore reduction chamber has a downward slope in the direction of the adjacent secondary chamber. In the melting zone of the secondary chamber said semifinished product is completely melted and reduced to pig iron by means of introducing a carbon-containing fuel and oxygen-containing gas. Then the melt is transferred into at least one bounded discharge zone, from where homogeneous portions of the melt product can be removed from the furnace.

In a modified form of my invention, a refining step is introduced in such bounded discharge zone of the secondary chamber to produce steel melt or nearly pure iron. In this case said bounded discharge zone includes means injecting oxygen into the melt. Such means, for instance, is a lance which is introduced through the roof of the melting chamber. Therefore, such process allows me to obviate the need for a steel converter, which is conventionally used in steel making, thus providing an economy in construction and maintenance. Additionally such design allows utilization of scrap. More specifically, I introduce a portion of the blown metal produced outside this furnace from scrap in a cupola into at least one secondary chamber, which provides a refining step.

Another modified form of this invention has the capability of producing cast iron. Such capability is achieved by means of introducing a melt produced from a selected scrap outside this furnace into the secondary chamber and mixing it with the pig iron melt inside to produce cast iron. In such process heat consumption is lower compared with conventional processes because in my process I avoid the usual remelting step relied upon for pig iron production. The present invention provides the technological flexibility of enabling simultaneous production of different types of iron melt in a single furnace. In this case one or more secondary chambers include two or more bounded discharge zones, while each bounded discharge zone can be used for production of pig iron or other types of iron melt, using a refining or mixing step.

Compared with non-blast furnaces, conventionally consisting of two separate apparatuses, my furnace, which includes immediately adjacent chambers sharing an inner side wall, benefits from economy in construction. Furthermore, compared with prior meltdown gasifiers as a secondary apparatus in non-blast furnaces or the melting zone in blast furnaces, the same quantity of the melted material is disposed in my design of secondary chamber on a larger area and with less depth. In this case heat transfer from two heat sources carried out by reaction gas inside the melted material and also above it, owing to postburning, is higher, thus providing lower consumption of carbon-containing fuel and oxygen-containing gas. Such heat transfer provides a capability of using coal with lower energy or with a high portion of volatile components.

Furthermore, modern blast furnaces and also ore reduction columns of non-blast furnaces have limited maximum throughput due to constraints on the capability of introducing a reduction gas that results in a maximum diameter (about 11 m). In the proposed furnace design the length of both chambers can be increased to have larger horizontal area, which leads to larger throughput compared with known blast and non-blast furnaces.

Compared with the relatively efficient non-blast process of the above-noted U.S. Pat. No. 4,566,904, where sponge iron as a semifinished product is produced in the ore reduction apparatus and reduction gas is cooled from 1500 degrees C. to 900 degrees C. (in a conditioning vessel) before being introduced into said apparatus, in my furnace a flowable layer as a semifinished product having temperature in a range of about 1150–1250 degrees C. is produced on the bottom of the ore reduction chamber. In such process I largely avoid cooling of the postburned reaction gases through the wall surfaces of the conditioning vessel. Therefore an increase of the cooling threshold of introduced reduction gas to about 1300 degrees C. results in decreasing of the heat losses.

Additionally, my furnace includes at least one charge hopper above and along the ore reduction chamber. And immediately adjacent alongside said charge hopper, one or more preheating compartments are formed above the ceiling of the ore reduction chamber. A plurality of tubes supplying an oxygen-containing gas extends through such preheating compartment and is heated by waste reduction gas flowing through said compartment, thereby heating this oxygen-containing gas. Such preheating inside the furnace results in decreasing of coal and oxygen consumption, thus improving operating economy.

DETAILED DESCRIPTION OF ILLUSTRATED EMBODIMENT

Figure 2:
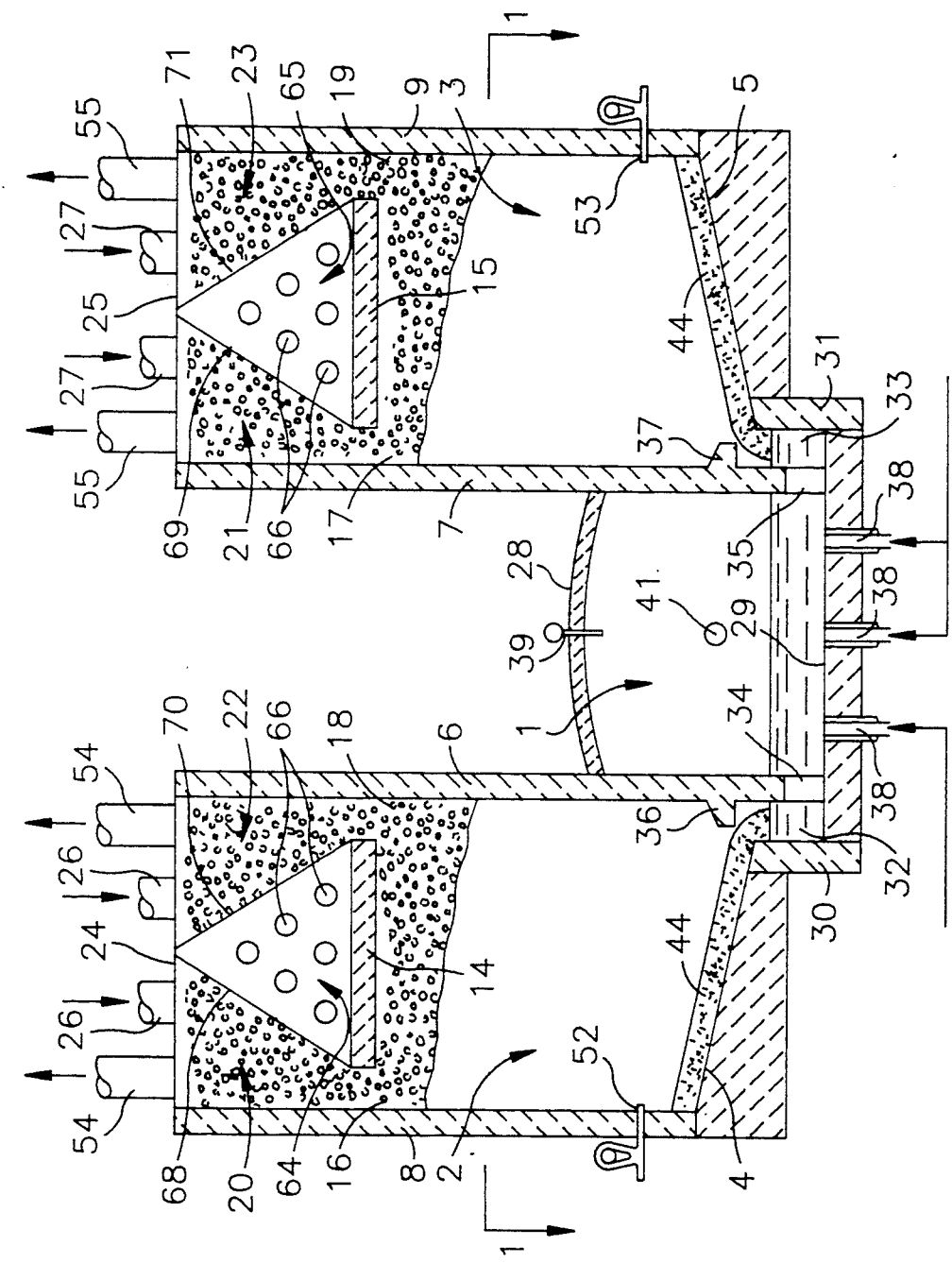
FIG. 2 is a vertical cross-sectional view taken along the line of 2—2 of FIG. 1.
Figure 3:
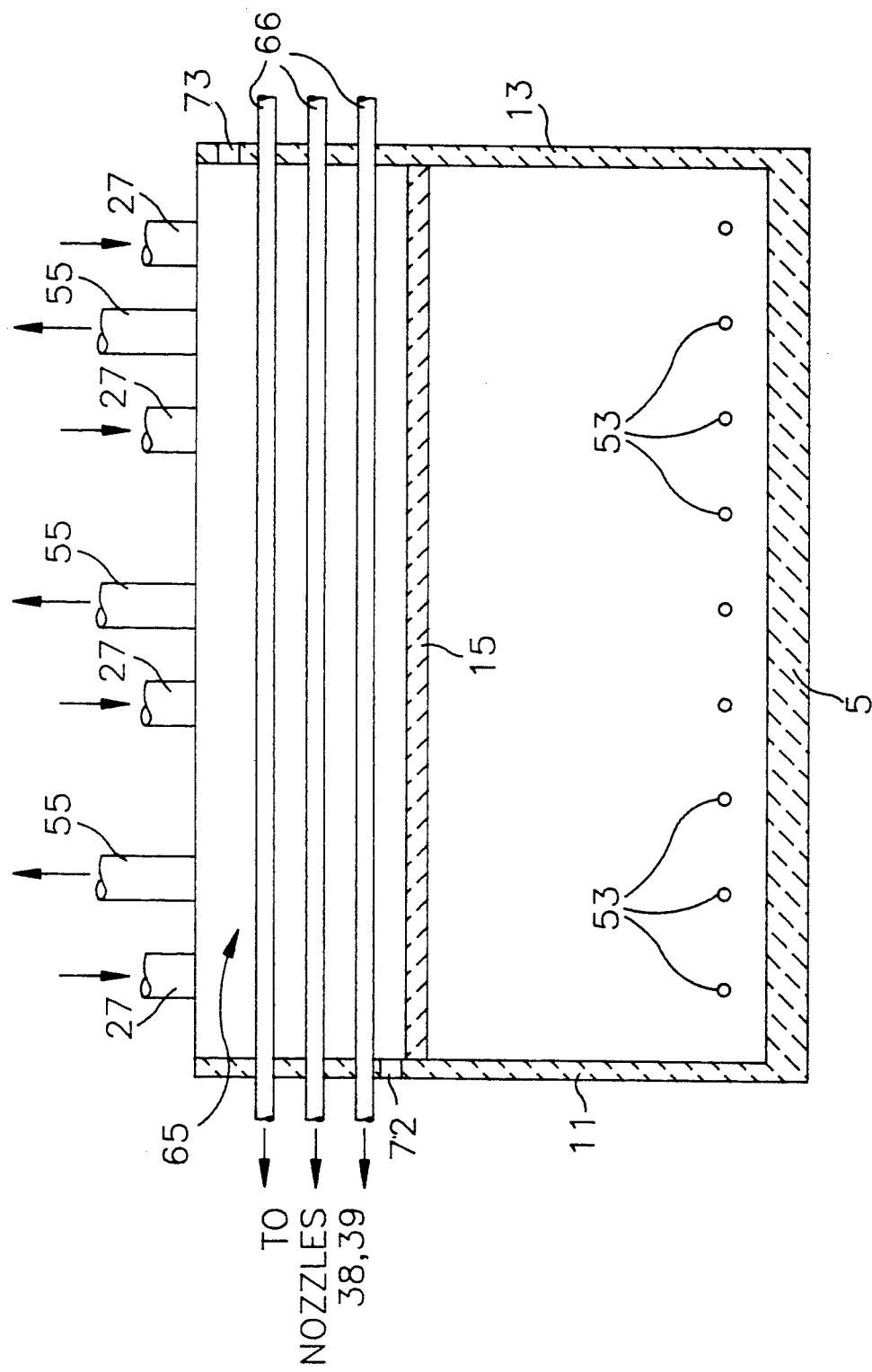
FIG. 3 is a longitudinal sectional view taken along the line 3—3 of FIG. 1.

Referring now to FIGS. 1–4 there is shown a furnace for the production of pig iron that includes a central secondary chamber 1 and two ore-reduction chambers 2 and 3 immediately adjacent the secondary chamber. Each ore reduction chamber is confined along the furnace by two spaced-apart side walls, i.e., by the inner side wall 6 or 7 and by the outer side wall 8 or 9. From the other side each ore reduction chamber is confined by two spaced-apart end walls 11 and 13. Each ore reduction chamber also has a bottom 4 or 5 having a downward slope preferably in a range of 5 degrees–20 degrees inclined toward the melting chambers. Each ore reduction chamber also has a ceiling 14 or 15 that extends between said end walls and partially covers said ore reduction chamber. In both ore reduction chambers four charge ports 16, 17, 18, 19 are formed in a furnace cross section between each top portion of all four side walls and each adjacent edge of corresponding ceilings. Immediately above said charge ports are four charge hoppers extending along the furnace side walls from which lump ore is fed through corresponding charge ports into the ore reduction chambers. Said four hoppers are designated 20, 21, 22, 23. Each said hopper is covered with a roof 24 or 25 and loaded with ore through pipes 26 or 27 at spaced locations along the furnace. In each ore reduction chamber ore moves downward to the bottom and is converted at first into sponge iron. The latter absorbs 3–4% carbon and this brings its melting point down to about 1150 degrees C. Such iron-carbon alloy in the form of a flowable layer having temperature in a range of 1150 degrees–1250 degrees C. is collected as semifinished product 44 on the bottom of the ore reduction chamber. The secondary chamber 1 is confined by two curved end walls 10 and 12 (FIG. 1), by a crown 28 (FIG. 2) from above, and from below by the bottom 29 (FIG. 2), which is lower than the bottom of each ore reduction chamber. Referring to FIG. 2, along the furnace the secondary chamber is confined by two inner side walls 6, 7 and by two intermediate side walls 30, 31. Each intermediate side wall is connected at its upper edge to the corresponding bottom of an ore reduction chamber and at its lower edge to the bottom 29 of the secondary chamber. The inner side walls are located in the furnace cross section between the two intermediate side walls, while a channel 32 or 33 is formed between each inner side wall and each adjacent intermediate side wall. The passage between each ore reduction chamber and the secondary chamber includes said channel 32 or 33 immediately leading to the opening 34 or 35 along the furnace and located in each inner side wall below the bottom 4 or 5 of the adjacent ore reduction chamber. Said semifinished product 44 flows through said channels 32, 33 and then through said openings 34, 35 into melting zone 56 of the secondary chamber. Each inner side wall has a barrier 36 or 37 above and along each channel for impeding the ore from downward movement into said channel 32 or 33. The bottom 29 of the secondary chamber is supplied with nozzles 38 consisting of two concentric tubes. Preheated oxygen or ground coal flows with a carrier gas into the melted material through the inner tube. Means including a switch-over from oxygen to the carbon-carrier gas suspension can be provided in accordance with German Patent Application No. 2,949,801. As a result of reaction between components, reaction gas mainly consisting of CO and $H_2$ is formed, whilst said semifinished product is completely melted by the heat thereby released while slag-forming reactions are carried out. Above the melt in melting zone 56 postburning action is carried out by means of introducing oxygen through the nozzles 39 extending through the crown 28, while CO and $H_2$ are partially converted into $CO_2$ and $H_2O$. Referring to FIG. 3, the angle between blast direction through nozzle 39 and the melt surface is in a range of 30–70 degrees. In such process of postburning, heat is released and largely transmitted to the melted material. Maintaining the bath temperature at about 1550 degrees C. and adding a quantity of lime as a slag-forming agent to achieve a slag basicity of about 2, the sulfur content in the liquid iron can be reduced to about 0.015%, and thus, any further expensive process of desulfurization is avoided.

The secondary chamber 1 has a cross partition 40 carried by the crown and dividing the space between the crown 28 and the melt level into two parts from which the postburned reaction gas is removed in two opposite directions through the pipes 41. Each pipe 41 extends into a conditioning vessel 43 having good heat insulation. The coal dust entering through nozzles 38 is mixed with said reaction gas causing the latter to be reduced and partially cooled to about 1300 degrees C. and thus to be converted into reduction gas that flows then through a hot cyclone 45 or 46 in which carried-along dust particles are separated. Two exhausters 47 and 48, each connected with an associated cyclone, provides a suction of the reaction gas through both ends walls of the melting chamber and then supply converted reduction gas from said cyclones into two blowers 49 and 50. The blowers 49 and 50 inject the reduction gas into the ore reduction chamber through a plurality of the tuyres 52 and 53 penetrating the outer side walls 8 and 9. The reduction gas upon being introduced into both ore reduction chambers is transferred upward through the ore and then is removed above said charge hoppers 20, 22, 21 and 23 through the tubes 54, 55, connected to an exhauster (not shown).

Figure 4:
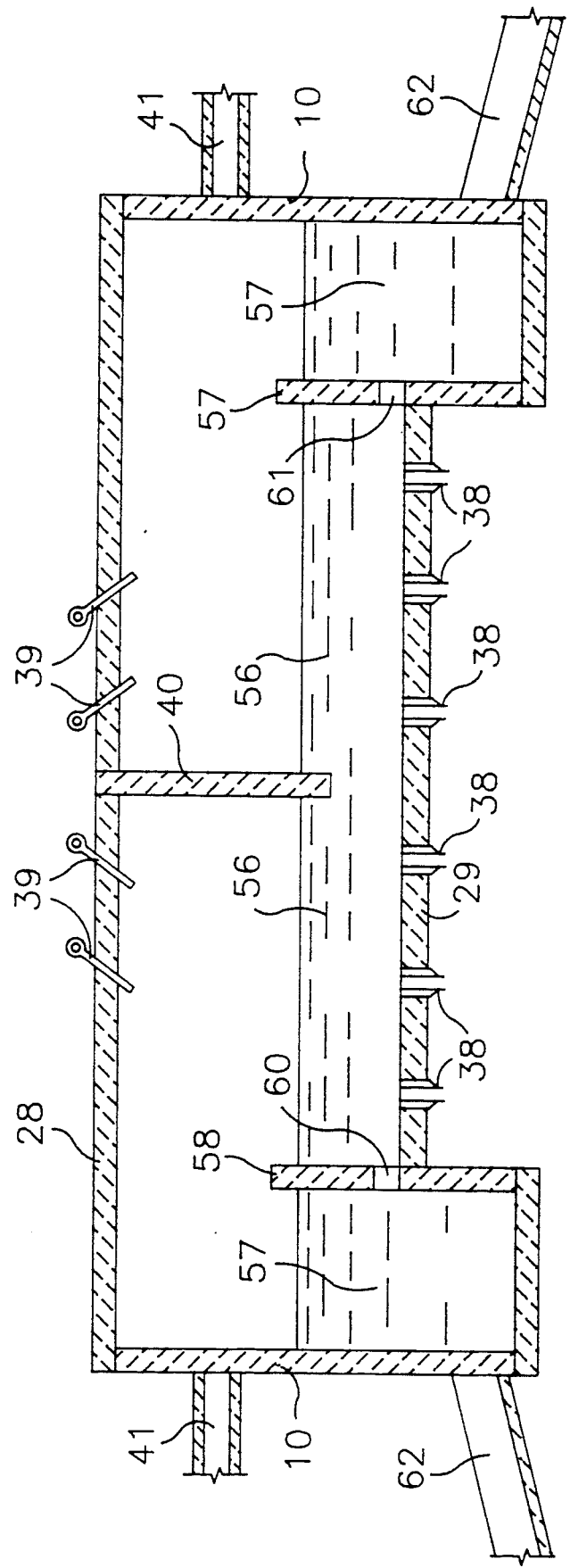
FIG. 4 is a longitudinal sectional view taken along the line 4—4 of FIG. 1.

In the melting zone 56 of said secondary chamber said semifinished product is completely melted and the produced melt consists of two layers, an upper slag layer and a lower iron layer. Referring to FIG. 4, the latter flows in two opposite directions towards said end walls 10 and 12 into two bounded discharge zones 57. Each bounded discharge zone is a pit located immediately adjacent to each end wall and is extended downward beyond the bottom of said melting zone and divided from the melting zone by partitions 58 and 59 having openings 60 and 61. During the melting process melt product entering each said pit is being homogenized and when its level raises to the required point, slagfree melt product is removed through tapholes 62.

Above the ceilings 14 and 15 are two preheating compartments 64 and 65, each extending longitudinally of the furnace and enclosing the tubes 66 supplying oxygen to the nozzles 38 located in the bottom 29 of said secondary chamber and also to the nozzles 39 in the crown 28. The tubes 66 also extend longitudinally of the furnace. Referring to FIGS. 2 and 3, each compartment 64 or 65 is confined by end walls 11 and 13, side walls 68, 70 or 69, 71 which are also side walls of adjacent charge hoppers and by the ceilings 14 or 15 from below. Hot waste reduction gas, after exiting from the furnace by means of the tubes 54 and 55, is then transferred into both said compartments 64 and 65 through the openings 72 in the end wall 11 and exits the compartment through the openings 73 in the opposite end wall 13. Hot reduction gases flowing through each compartment between its end walls heat the supply tubes 66 and thus preheat oxygen supplied to the nozzles 38, 39.

Referring to FIG. 5, 6, 7, 8 and 9 there is depicted a second embodiment of this invention and, more specifically, a furnace for producing molten steel. In general, the components of FIGS. 5, 6, 7, 8, and 9 that correspond to similar components in FIGS. 1, 2, 3, and 4 are designated with the same references numerals as used in FIG. 1, 2, 3, and 4 plus 100 and include "a" or "b" suffixes for left and right groups, respectively, of corresponding components.

This furnace includes one central ore reduction chamber 102 and two outer immediately adjacent secondary chambers 101a and 101b. The ore reduction chamber is confined along the furnace by two spaced-apart end walls 111 and 113, by the bottom 105 having a downward slope in a range of 5-20 degrees from the middle toward each melting chamber and by two ceilings 114 and 115, each extending between the end walls 111 and 113 but only partially covering the ore reduction chamber 102 in the furnace cross section to form three charge ports 116, 117 and 118 along the furnace for ore feeding. Each of the two secondary chambers is confined by the crown 128a or 128b, from above and from below by the bottom 129a or 129b, which is lower than the bottom 105 of the ore reduction chamber. Along the furnace each secondary chamber is confined by the inner side walls 106 or 107 and outer side walls 108 or 109 and by two intermediate side walls 130 and 131, each of which is connected at its upper edge to the bottom 105 of the ore reduction chamber. Each intermediate side wall 130 or 131 is extended downward below its associated inner side wall, and an opening 134 or 135 is formed along the furnace between each inner side wall and the associated intermediate side wall.

Figure 5:
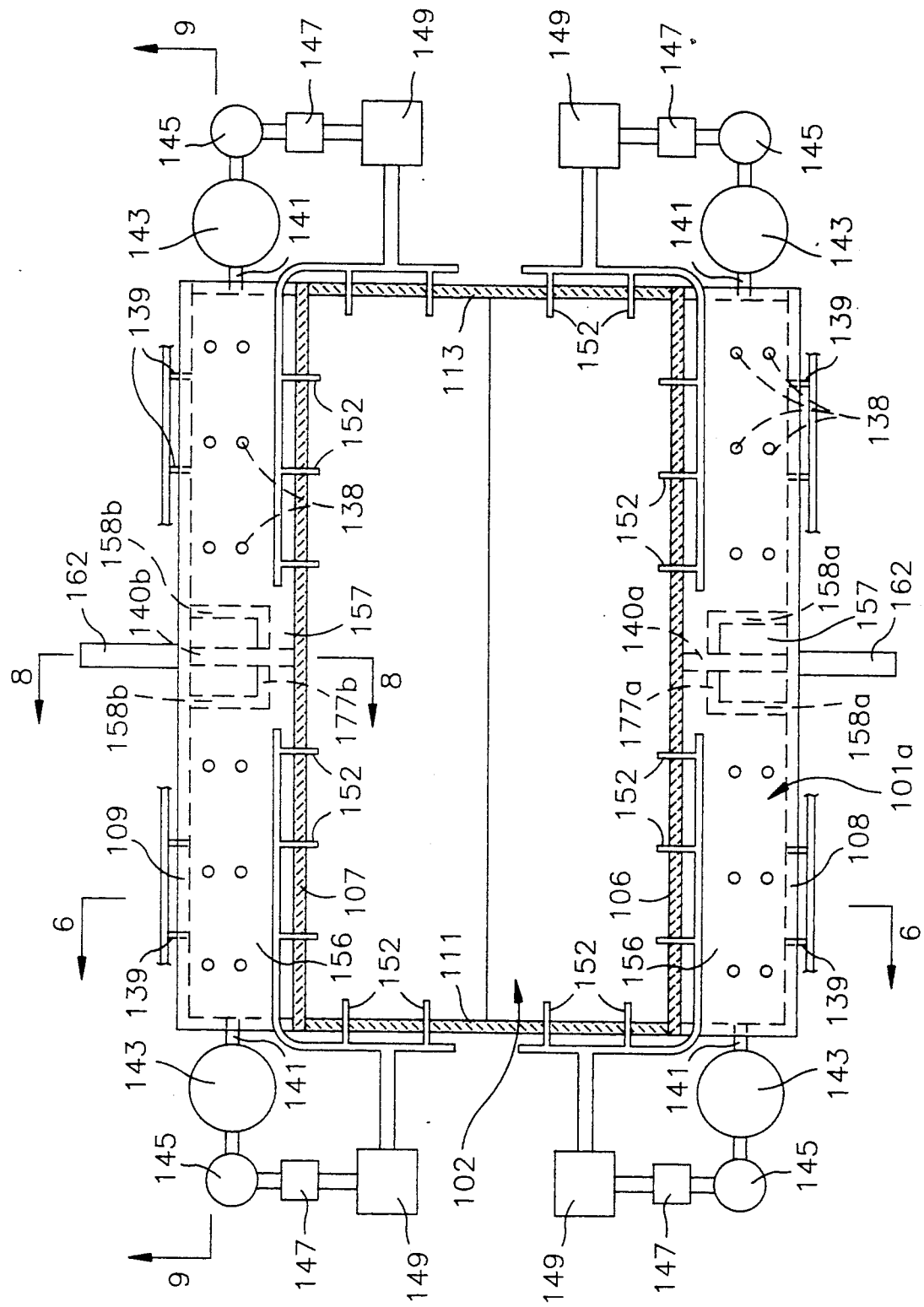
FIG. 5 is a horizontal sectional view of another modified form of my furnace taken along the line 5—5 of FIG. 6.
Figure 6:
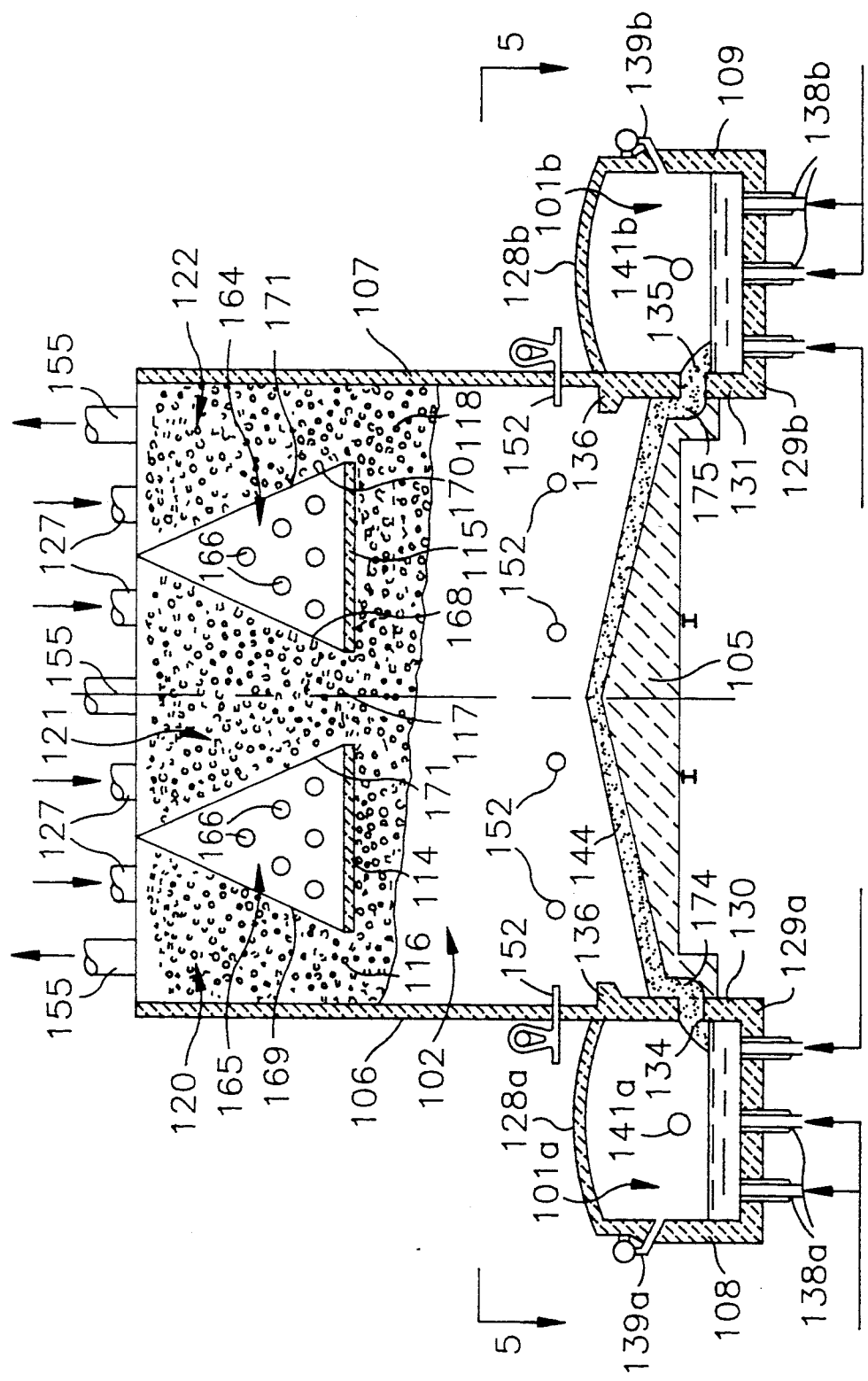
FIG. 6 is a vertical cross-sectional view taken along the line 6—6 of FIG. 5.
Figure 7:
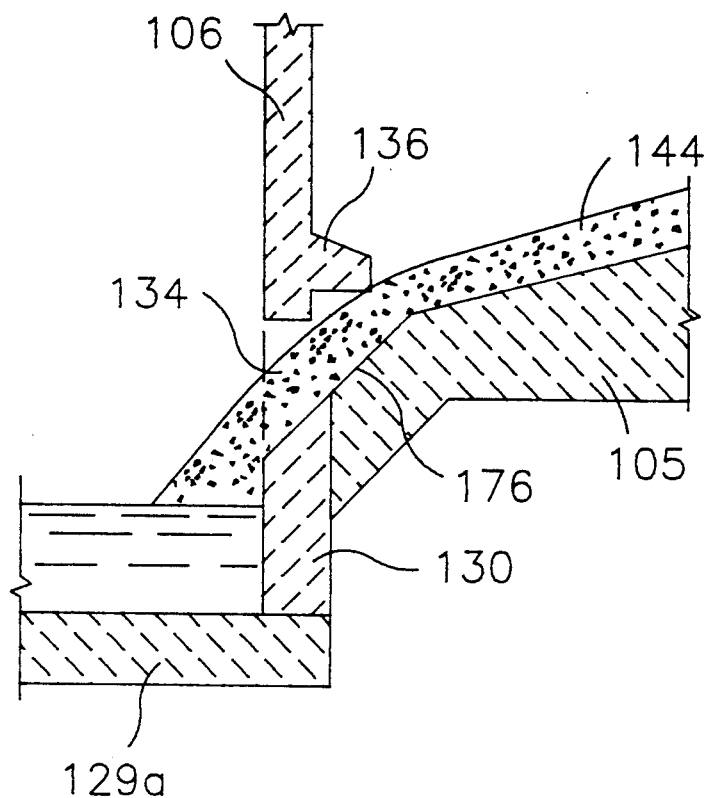
FIG. 7 is a fragment of FIG. 6 where modified passage means is shown.
Figure 8:
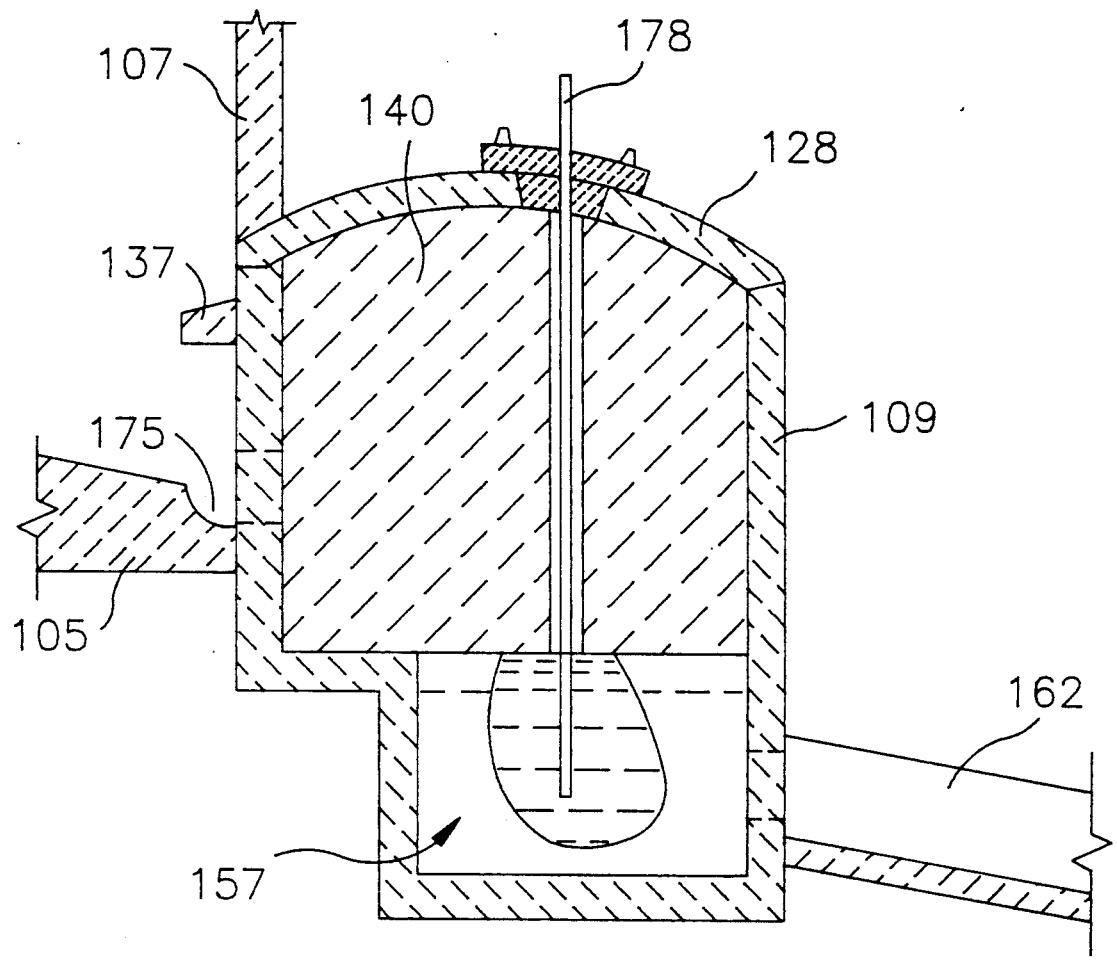
FIG. 8 is a fragment of a vertical cross-sectional view taken along the line 8—8 of FIG. 5.
Figure 9:
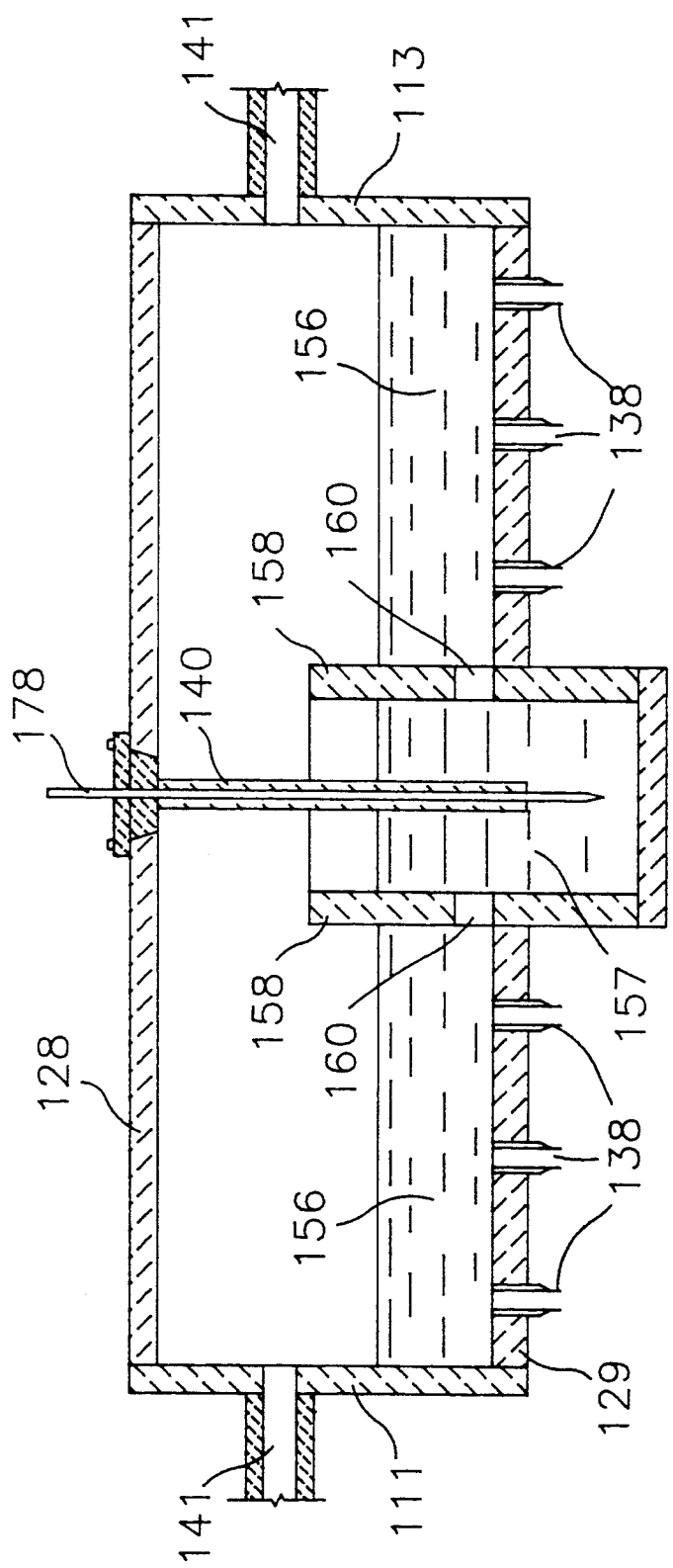
FIG. 9 is a longitudinal section view taken along the line 9—9 of FIG. 5.

Immediately adjacent each inner side wall the bottom 105 of the ore reduction chamber has a recess 174 or 175 along the furnace, and passage means between the ore reduction chamber and each secondary chamber includes said recess immediately leading to the corresponding opening 134 or 135. FIG. 7 shows an alternative design of passage means between the ore reduction chamber and each secondary chamber. In this design the bottom 105 of the ore reduction chamber immediately adjacent each inner side wall has a single bevel 176 immediately leading to the lower edge of the opening 134 along the furnace between each inner side wall and the associated intermediate side wall. Each inner side wall has a barrier 136 or 137 located above the flowable layer 144 and along each said recess 174 or 175, or each single bevel 176 (FIG. 7) for impeding ore from downward movement into each said recess or single bevel. Referring to FIGS. 8 and 9, each secondary chamber has a cross partition 140 dividing the space between the crown 128 and the melt level into two parts from which said reaction gas is removed in two opposite directions through the refractory pipes 141 into four conditioning vessels 143 (FIG. 5). Referring to FIG. 9, each secondary chamber includes a melting zone 156 and bounded discharge zone 157. The latter is a pit extended downwardly beyond the bottom 129 of the secondary chamber and located between each pair of inner and outer side walls. Each pit is divided from the melting zone by two cross partitions 158 and by alongside partition 177a or 177b (FIG. 5). As seen in FIG. 9, the lower layer of the melt produced in the melting zone flows through the openings 160 in the cross partitions 158 into each said pit. A lance 178 extends through the crown 128 above each pit and then through the cross partition 140 via a vertical hole therein into the lower portion of the melt. Oxygen is injected through the lance 178 into the melt, and during such oxygen treatment carbon and impurities are partially burnt out and the steel product melt is produced. Each melting zone and its associated pit are in free communication, and therefore the melt levels in them are equal. The melt in each pit includes a top and a lower portion located respectively above and below the upper edge of the openings 160 in the cross partitions 158. During the melting process a volume of the melt is continually raised while melt levels in the melting zone and associated pit are equal. When the process of oxygen treatment for the lower portion of the melt is completed, the supplying of oxygen through the lances 178 is stopped and then the lower portion of the melt is removed from each pit through the tapholes 162 (FIG. 8) while the level of the melt in the pit immediately after tapping should be not lower than the upper edge of the openings 160. Then after removing said lower portion of the melt, the former top portion now becomes a lower portion in a new cycle of oxygen treatment.

In this embodiment the following components are similar to the components disclosed in first embodiment: means for adding powdered coal and air in the secondary chamber; means for introducing a reduction gas into the ore reduction chamber; means for converting postburned reaction gas into reduction gas; the charge hoppers and preheating compartments. In this embodiment to produce iron melt that is further used in the production of wrought iron, refining of the pig iron is carried out until the pig iron is converted to nearly pure iron having a total content of impurities of about 0.4% by weight.

Figure 10:
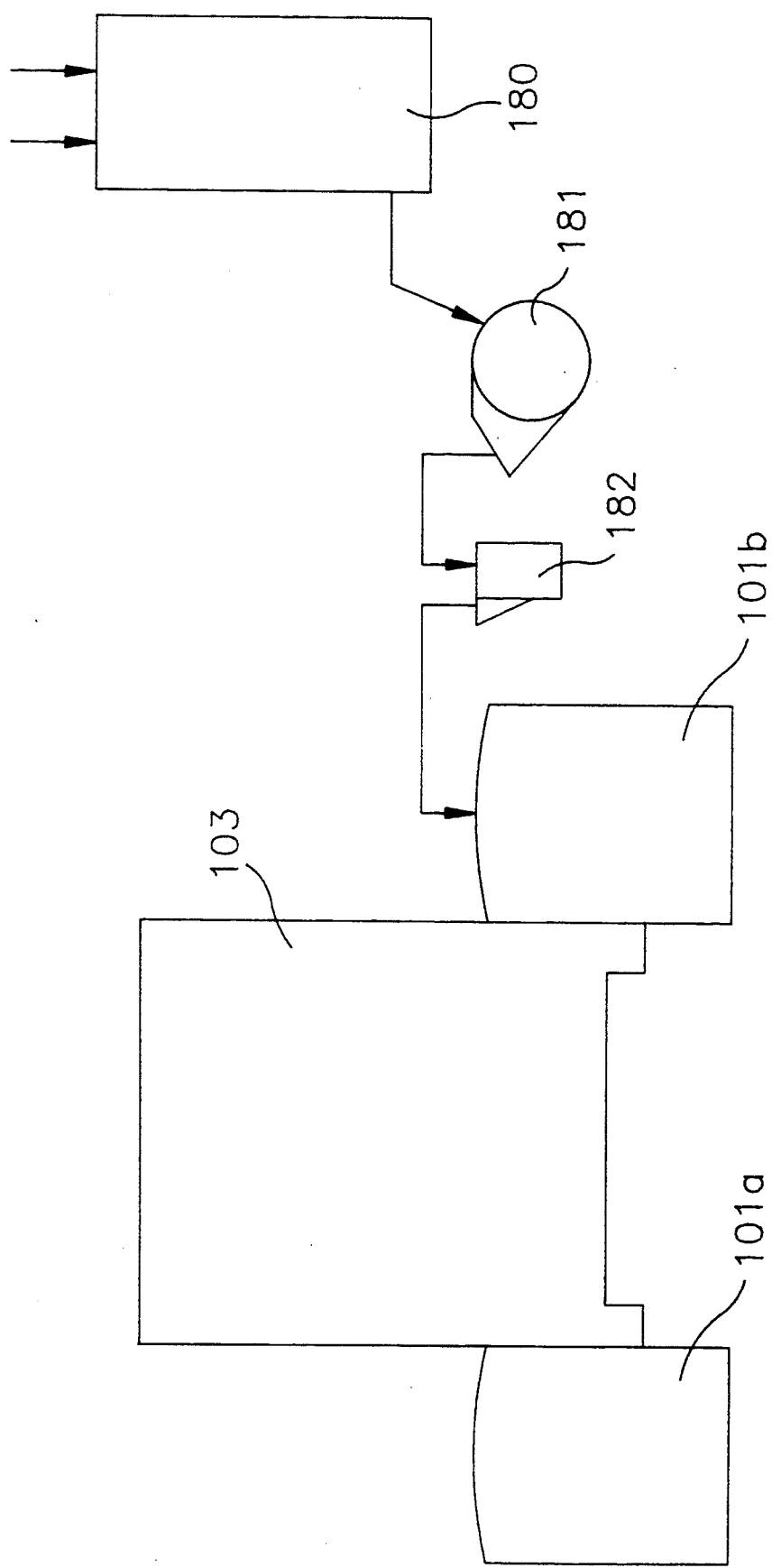
FIG. 10 is a scheme showing utilization of melt produced in a cupola from a scrap.
Figure 11:
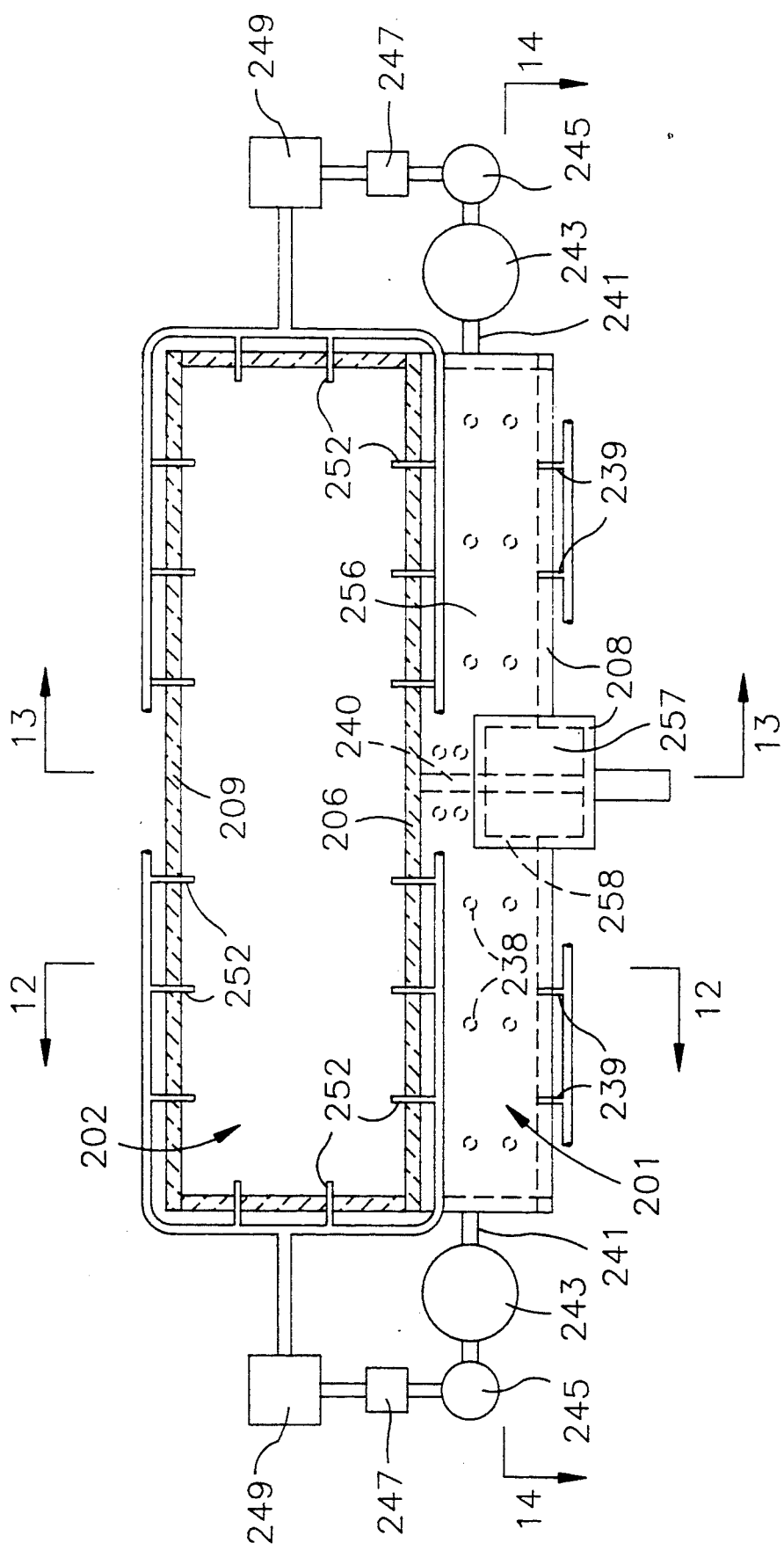
FIG. 11 is a horizontal sectional view of another modified form of my furnace taken along the line 11—11 of FIG. 12.
Figure 12:
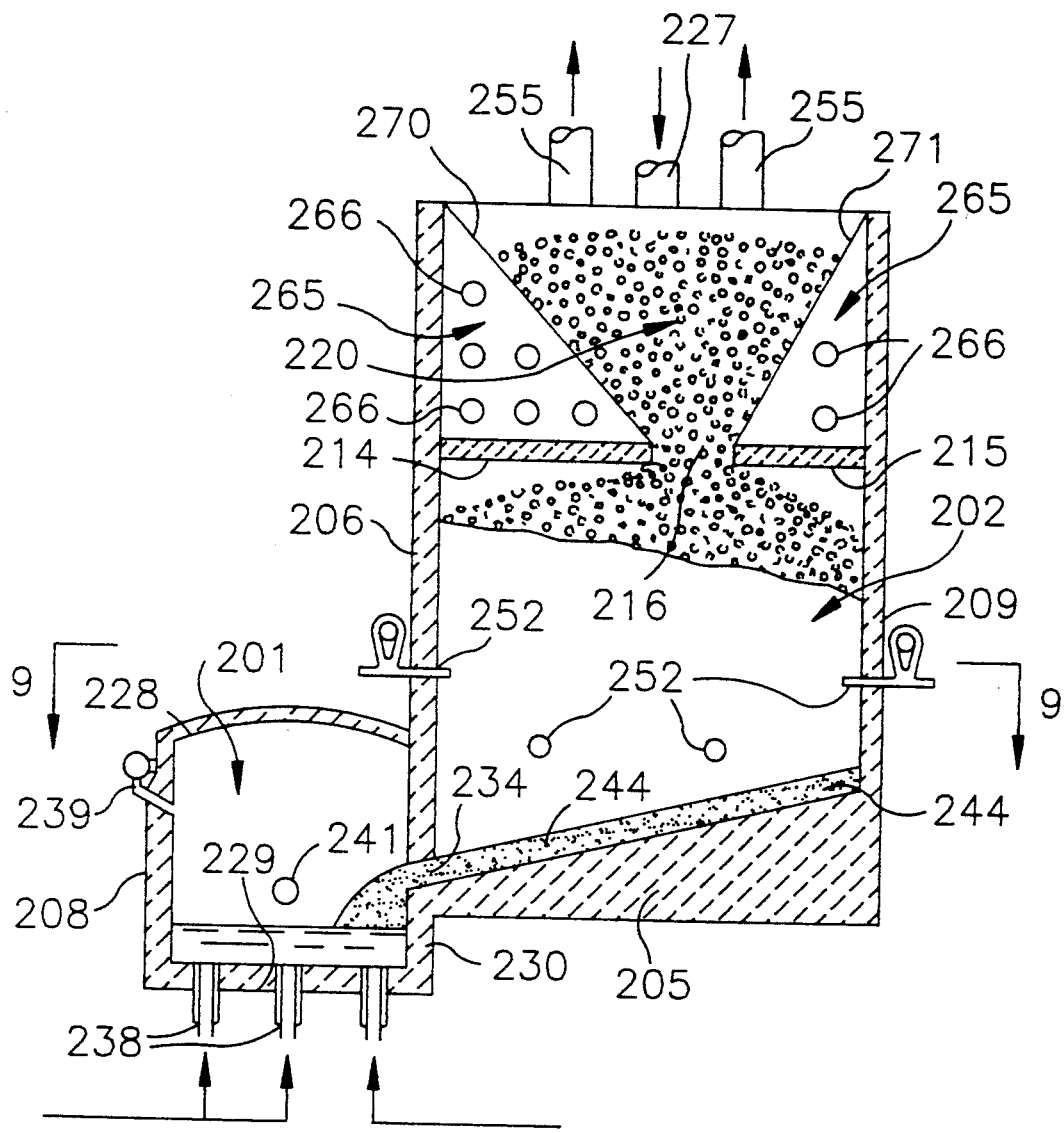
FIG. 12 is a vertical cross-sectional view taken along the line 12—12 of FIG. 11.

FIG. 10 shows a scheme disclosing another modification of the steelmaking process that additionally provides utilization of the melt produced from scrap outside this furnace in a cupola. In this scheme is shown the furnace including one central ore reduction chamber 103 and two secondary chambers 101a, 101b and having the same design as disclosed in second embodiment. Also shown in FIG. 10 is a cupola 180 where liquid blown metal is produced, a temporary storage vessel 181 and a transporting ladle 182. In the cupola scrap together with coke are smelted and liquefied. Some of the heat used for this purpose is recovered from waste reduction gas. A portion of this liquid blown metal is introduced in the bounded discharge zone of the secondary chamber immediately after discharging a portion of the steel melt produced in each refining cycle. It is, furthermore, within the scope of the invention to introduce periodically said liquid blown metal into the melting zone of said secondary chamber through an opening in the crown. In this case this portion of the liquid blown metal is then mixed with melt in the melting zone to produce a homogeneous melt product, which is then transferred into the bounded discharge zone to carry out a refining cycle as was above disclosed.

Figure 13:
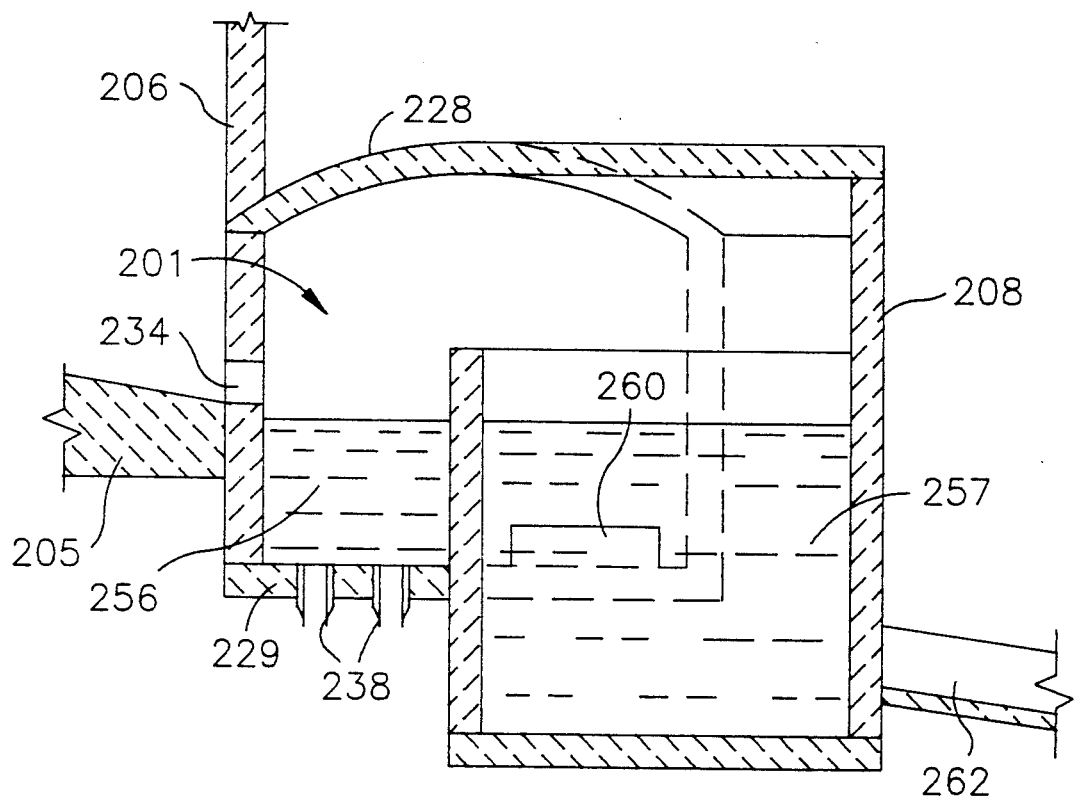
FIG. 13 is a fragment of vertical cross-sectional view taken along the line 13—13 of FIG. 11.
Figure 14:
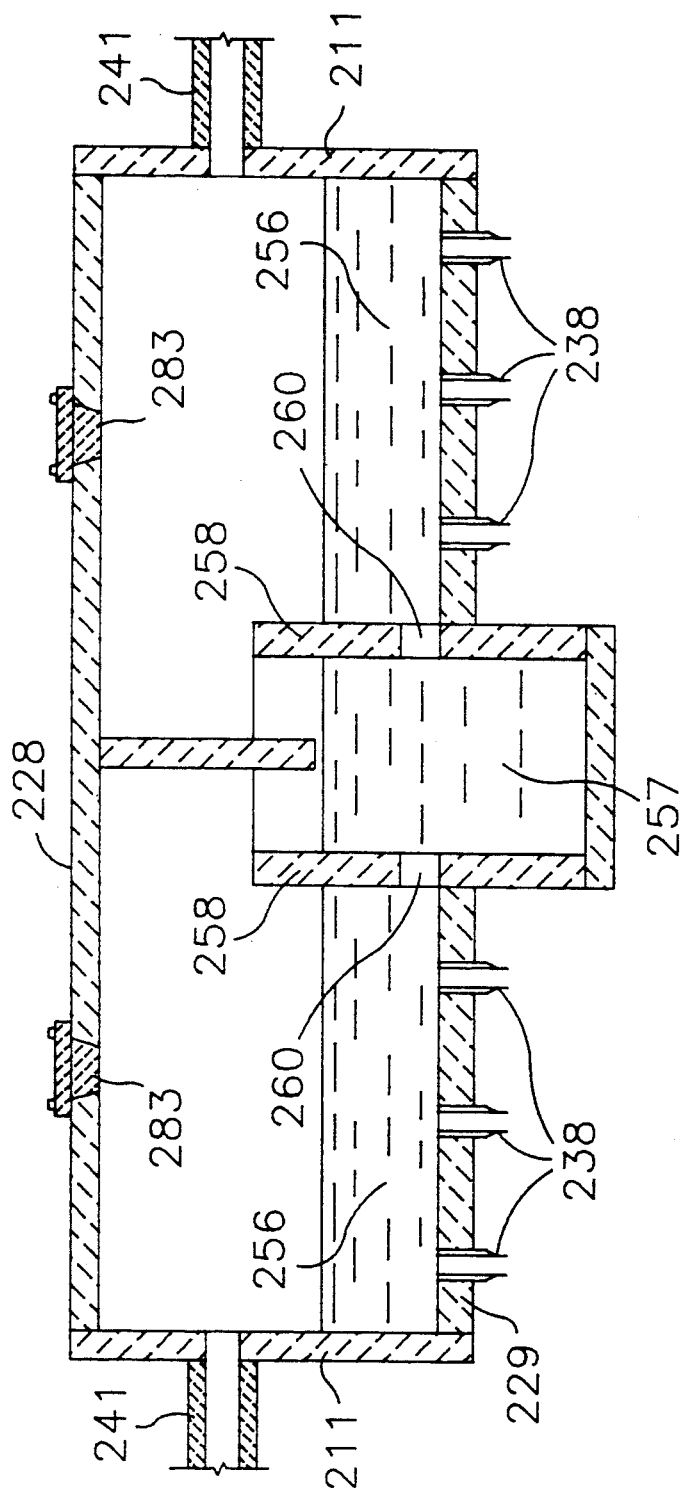
FIG. 14 is a longitudinal sectional view taken along the line 14—14 of FIG. 11.

A third embodiment comprising a furnace for the production of cast iron is shown in FIGS. 11, 12, 13, and 14. This furnace consists of one ore reduction chamber 202 and one immediately adjacent secondary chamber 201. In general, the components of FIGS. 11, 12, 13, and 14 that correspond to similar components of FIGS. 1, 2, 3, and 4 are designated with the same reference numerals plus 200. In this furnace the intermediate side wall 230 is extended downwardly beneath the inner side wall 206 in the same manner as in the second embodiment, but a passage between the two chambers 201 and 202 has an alternative design and includes an opening 234 along the furnace between the inner side wall and the intermediate side wall immediately above the lower edge of the bottom of the ore reduction chamber. In this furnace the tuyres 230 for introducing an oxygen-containing gas above the melted material extend through the outer side wall 208. Furthermore, as seen in FIG. 13, the bounded discharge zone 257 of the secondary chamber is a pit having a design similar to that of pit 157 in the second embodiment. In the same way as disclosed in previous embodiments semifinished product 244 is produced on the bottom 205 of the ore reduction chamber and then is completely melted in the melting zone 256 of the secondary chamber 201. Referring to FIG. 14, the crown 228 of the secondary chamber has two openings 283, each of which in a working position is covered by a separate refractory plug 284 having a cap and a body. A portion of the melt produced from selected scrap outside this furnace in a cupola (not shown) is introduced into the secondary chamber through said openings 283. During the melting process the lower layer of the melt (without slag) enters the pit and is homogenized. When the level of the melt is raised to the required point, the melt product is removed through the taphole 262. A slag layer, which is the upper layer of the melt in the melting zone, is periodically removed from the melting zone through a taphole (not shown). In this embodiment the following components are similar to the components disclosed in previous embodiments: means for adding powdered coal and oxygen-containing gas in the melting chamber; means for introducing a reduction gas into the ore reduction chamber; means for converting postburned reaction gas into reduction gas; charge hoppers; and preheating compartments.

It will be apparent from the above detailed description that this invention makes it possible to effect simultaneous production of different types of iron melt in a single furnace. In each embodiment, each secondary chamber of the furnace includes two or more bounded discharge zones. And every bounded discharge zone can function for the production of pig iron or some other type of iron melt depending upon the particular one of the refining or mixing steps used.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the Unites States is:

1. A furnace for production of liquid iron comprising:
   (a) a bottom;
   (b) two spaced-apart end walls;
   (c) at least three spaced-apart side walls, two being outer side walls and at least one being an inner side wall;
   (d) an interior bounded by said bottom, said outer side walls and said end walls; and in which:
   (e) by means of said inner side wall said interior is divided into a plurality of immediately adjacent side-by-side chambers;
   (f) one of said chambers is an ore reduction chamber where ore moves downward to said bottom and is converted at first into sponge iron, which, absorbing carbon, is then converted into iron-carbon alloy in the form of a flowable layer having temperatures of about the melting point of said iron-carbon alloy, while said flowable layer as a semifinished product is collected on the bottom, the ore in said ore reduction chamber is supported by said bottom, and
   (g) another of said chambers is a secondary chamber where said semifinished product is completely melted in a melting zone of said secondary chamber and the secondary chamber further includes a bounded discharge zone separated from said melting zone by partition means containing an opening through which low layer portion of the melt from said melting zone is transferred into said bounded discharge zone;
   (h) said ore reduction chamber is partially covered with at least one ceiling extending between said end walls, and said ore reduction chamber includes means forming at least one charge port for ore feeding from above and along said ore reduction chamber;
   (i) a bottom of said secondary chamber is lower than a bottom of said adjacent ore reduction chamber; the furnace further comprising:
   (j) passage means leading from said ore reduction chamber to said secondary chamber for providing at least one passage between said chambers through which said semifinished product that has collected on the bottom of said ore reduction chamber can flow into said secondary chamber;
   (k) means for introducing a reduction gas into said ore reduction chamber in the vicinity of the bottom;
   (l) means for introducing a carbon-containing fuel and at least one oxygen-containing gas into the melt in said melting zone of said secondary chamber to produce a reaction gas and to generate heat; and
   (m) outlet means through which portions of the melt product can be removed from said bounded discharge zone of said secondary chamber.

2. The furnace of claim 1 wherein the bottom of said ore reduction chamber has a downward slope toward said adjacent secondary chamber.

3. The furnace of claim 1 wherein said bounded discharge zone includes a pit extending downward from the bottom of said melting zone and at least one wall divides the pit from the melting zone and has one or more openings through which a lower layer of the melt in said melting zone can flow into said pit.

4. The furnace of claim 3 wherein said secondary chamber includes means for injecting oxygen into the melt in the bounded discharge zone to provide refining of the melt.

5. The furnace of claim 4 wherein said means injecting oxygen into the melt is a lance entering said discharge zone through the roof of said secondary chamber and through a partition extended downward from said roof.

6. The furnace of claim 1 wherein said secondary chamber includes means for introducing an oxygen-containing gas above the melted material in said melting zone to provide postburning of the produced reaction gas.

7. The furnace as defined in claim 6 and additionally including means for converting said postburned reaction gas into said reduction gas, said converting means comprising:
(a) a conditioning vessel where reaction gas transferred from said secondary chamber is reduced for producing reduction gas; and
(b) at least one cyclone for separating particles from said reduction gas.

8. The furnace of claim 7 wherein:
(a) said conditioning vessel and said cyclone are located in the vicinity of one of said end walls, and another conditioning vessel and cyclone are located in the vicinity of the other of said end walls;
(b) said secondary chamber has a roof and a cross partition dividing the secondary chamber between said roof and the melt level into two parts, from one of which reaction gas is removed into one of said conditioning vessels and from the other of which reaction gas is removed into the other of said conditioning vessels.

9. The furnace of claim 1 wherein:
(a) the bottoms of said secondary chamber and said ore reduction chamber are connected by an intermediate side wall,
(b) said intermediate side wall is extended downward from said inner side wall;
(c) said passage means between said ore reduction chamber and said adjacent secondary chamber includes at least one opening along the furnace between said inner side wall and said intermediate wall immediately above the bottom of said ore reduction chamber.

10. The furnace of claim 1 wherein:
(a) the bottoms of said secondary chamber and said ore reduction chamber are connected by an intermediate side wall,
(b) said intermediate side wall is extended downward from said inner side wall;
(c) the bottom of said ore reduction chamber immediately at said inner side wall has a recess along the furnace;
(d) said passage means between said ore reduction chamber and said secondary chamber includes said recess immediately leading to at least one opening located along the furnace between said inner side wall and said intermediate side wall; and
(e) said inner side wall has a barrier above and along said recess for impeding downward movement of said ore into said recess.

11. The furnace of claim 1 wherein:
(a) the bottoms of said secondary chamber and said ore reduction chamber are connected by an intermediate side wall,
(b) said intermediate side wall is located in a furnace cross section between said inner side wall and said outer side wall, while a channel is formed between said inner side wall and said intermediate side wall;
(c) said passage means between said ore reduction chamber and said secondary chamber includes said channel immediately leading to at least one opening along the furnace and located in said inner side wall below the bottom of said ore reduction chamber, and
(d) said inner side wall has a barrier above and along said channel for impeding downward movement of ore into said channel.

12. The furnace of claim 1 wherein:
(a) above each of said charge ports is a charge hopper along and above said ore reduction chamber;
(b) at least one preheating compartment is extended along the furnace and above the ceiling of said ore reduction chamber, while said preheating compartment is immediately adjacent to at least one said charge hopper;
(c) at least one tube for supplying oxygen-containing gas extends through said preheating compartment and is heated by hot gases flowing through said compartment, thereby heating said oxygen-containing gas.

13. The furnace of claim 1 wherein:
(a) said furnace interior comprises one central said secondary chamber and two outer said ore reduction chambers, each said ore reduction chamber being located immediately adjacent to said secondary chamber, and
(b) said outlet means comprises one or more tapholes connected to said bounded discharge zone for removing the melt product from the furnace.

14. The furnace of claim 13 wherein said bounded discharge zone includes means for injecting oxygen into the melt therein.

15. The furnace of claim 1 wherein:
(a) said furnace interior comprises one said ore reduction chamber and two said secondary chambers, each of said secondary chambers being located immediately adjacent to said ore reduction chamber, and
(b) said outlet means comprises one or more tapholes connected to the bounded discharge zone of each secondary chamber for removing the melt product from the furnace.

16. The furnace of claim 15 wherein (a) said bounded discharge zone includes means for injecting oxygen into the melt therein to produce refined melt product and (b) said outlet means is provided for discharging refined melt product from the furnace.

17. The furnace of claim 15 wherein at least one of said bounded discharge zones discharges pig iron melt and another of said discharge zones includes means injecting oxygen into the melt therein and means discharging refined melt product from said other discharge zone.

18. The furnace of claim 1 wherein said furnace interior comprises:
  (a) one said ore reduction chamber and immediately adjacent thereto one said secondary chamber; and
  (b) one or more tapholes connected to said bounded discharge zone for removing melt product from the furnace.

19. The furnace of claim 18 wherein said one bounded discharge zone is also provided with means for injecting oxygen into the melt to produce refined melt product and said outlet means is provided for discharging refined melt product from said one bounded discharge zone.

20. A method for production of liquid iron comprising:
  (a) providing the furnace of claim 1;
  (b) introducing a compound containing iron and oxygen into said ore reduction chamber through said charge port of said ore reduction chamber;
  (c) introducing hot reduction gas into said ore reduction chamber in the vicinity of the bottom of said ore reduction chamber and transferring said reduction gas upward through said compound while the latter moves downward to the bottom and is at first converted into sponge iron, which, absorbing carbon, is then converted on the bottom into iron-carbon alloy in the form of a flowable layer having a temperature of about the melting point of said iron-carbon alloy;
  (d) discharging said flowable layer through said passage means into said secondary chamber while the level of melted material in said secondary chamber is lower than the bottom of said ore reduction chamber;
  (e) introducing a carbon-containing fuel and at least one oxygen-containing gas into the melting zone of said secondary chamber to obtain a reaction gas and to provide heat transfer to the melted material for complete melting; while after complete melting low layer portion of the melt is transferred into said bounded discharge zone; and
  (f) removing portions of the melt product from the bounded discharge zone of said secondary chamber.

21. The method of claim 20 wherein oxygen-containing gas is injected above the melted material in the melting zone of said secondary chamber to cause a postburning of produced reaction gas for providing an additional heat transfer to the melted material.

22. The method of claim 20 wherein blown metal produced outside said furnace from selected scrap iron is additionally introduced into at least one said secondary chamber and is mixed with pig iron melt therein to produce cast iron.

23. A method for production of liquid iron comprising:
  (a) providing the furnace of claim 4;
  (b) introducing a compound containing iron and oxygen into said ore reduction chamber through said charge port of said ore reduction chamber;
  (c) introducing hot reduction gas into said ore reduction chamber in the vicinity of its bottom and transferring said reduction gas upward through said compound while the latter moves downward to the bottom and is at first converted into sponge iron, which, absorbing carbon, is then converted on the bottom into iron-carbon alloy in the form of a flowable layer having a temperature of about the melting point of said iron-carbon alloy;
  (d) discharging said flowable layer through said passage means into said secondary chamber while the level of melted material in said secondary chamber is lower than the bottom of said ore reduction chamber;
  (e) introducing a carbon-containing fuel and at least one oxygen-containing gas into the melting zone of said secondary chamber to obtain a reaction gas and to provide heat transfer to the melted material for complete melting; while after complete melting low layer portion of the melt is transferred into said bounded discharge zone; and
  (f) refining melt in at least one said bounded discharge zone by injecting oxygen into the melt;
  (g) removing a portion of the refined melt from the bounded discharge zone where said refining is completed following said refining step for a new portion of the melt.

24. The method of claim 23 wherein blown metal produced outside said furnace from scrap is additionally introduced into said melting or discharge zone of at least one said secondary chamber.

* * * * *